United States Patent
Nakashima

(10) Patent No.: US 6,473,567 B1
(45) Date of Patent: Oct. 29, 2002

(54) LENS BARREL HAVING FACILITY FOR MAINTAINING MESHED RELATION BETWEEN MOVABLE LENS DRIVE MEANS AND MOVABLE LENS MEANS

(75) Inventor: Shigeo Nakashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/458,518

(22) Filed: Dec. 13, 1999

(30) Foreign Application Priority Data

Dec. 18, 1998 (JP) .............................. 10-361356

(51) Int. Cl.[7] ................. G03B 17/00; G03B 17/04; G03B 5/02
(52) U.S. Cl. .................. 396/75; 396/349; 396/439
(58) Field of Search ........................... 396/72, 75, 349, 396/79; 359/676, 703, 704

(56) References Cited

U.S. PATENT DOCUMENTS

| | | | | |
|---|---|---|---|---|
| 4,522,270 A | * | 6/1985 | Kishi | ........................ 173/217 |
| 4,864,337 A | * | 9/1989 | Himuro et al. | ............... 396/72 |
| 4,950,061 A | * | 8/1990 | Tsurukawa et al. | ........... 396/79 |
| 4,974,949 A | * | 12/1990 | Tanaka | ........................ 359/704 |
| 5,086,312 A | * | 2/1992 | Tanaka et al. | ................. 396/75 |
| 5,153,626 A | * | 10/1992 | Yamamoto | ................... 396/349 |
| 5,774,748 A | * | 6/1998 | Ito et al. | ...................... 396/349 |
| 5,842,055 A | * | 11/1998 | Tamura | ....................... 396/72 |

* cited by examiner

*Primary Examiner*—Christopher Mahoney
(74) *Attorney, Agent, or Firm*—Robin, Blecker & Daley

(57) ABSTRACT

A lens barrel includes a shaft member extending in an optical axis direction, the shaft member having a screw part formed thereon and arranged to be driven by a motor to rotate on an axis thereof A moving member has a screw-engaging part engaging the screw part of the shaft member and the moving member is arranged to move in the optical axis direction. A holding member holds a lens and the holding member and the moving member are moved together in the optical axis direction by rotation of the shaft member. An urging member is arranged to urge the holding member and the moving member to move together in the optical axis direction and permits relative movement of the holding member and the moving member. A stopper is arranged to have the holding member to abut thereon when the holding member moves relative to the moving member against an urging force of the urging member.

6 Claims, 4 Drawing Sheets

LENS BARREL HAVING FACILITY FOR MAINTAINING MESHED RELATION BETWEEN MOVABLE LENS DRIVE MEANS AND MOVABLE LENS MEANS

BACKGROUND OF THE INVENTION

1. Field of the Invention

The present invention relates to a lens barrel or a camera body adapted for an optical apparatus having a lens arranged to be movable in an optical axis direction, such as a digital still camera, a video camera or a silver-halide camera.

2. Description of Related Art

The lens barrels of the kind mentioned above are arranged, in many cases, to drive a movable lens to move in the direction of an optical axis by enmeshing a rack with a feed screw of a stepping motor. It has been generally practiced to arrange the rack to be rotatable with respect to the movable lens and to be movable integrally with the movable lens in the optical axis direction.

The maximum drawn-in (retractable) position of the movable lens when the camera is not used for photo-taking is set by drawing the movable lens inward to a predetermined extent from a position of the movable lens detected by a position detector with the detected position used as a reference position.

In the case of the conventional arrangement mentioned above, since the rack and the movable lens are integral with each other in the optical axis direction, their relative positions never deviate from each other in this direction. Therefore, in a case where the movable lens is pushed by an external force in the optical axis direction, the rack also moves in the same direction. In such a case, the rack tends to disengage from the feed screw of the stepping motor. Such disengagement hinders the movable lens from being correctly moved in the optical axis direction, thereby making it no longer possible to do zooming or focusing in photo-taking.

In detecting the position of the movable lens with the position detector, the detection is made at an error of about ±0.5 mm due to the detection error of the position detector and also an error of mounting the position detector on the lens barrel. Generally, the movable lens is controlled not to collide against a fixed part of the lens barrel. However, considering an error of the detected position, the movable lens must be arranged to be brought to a stop at a position obtained by drawing out the movable lens from the fixed part of the lens barrel as much as the detected position error. The movable lens, therefore, comes to be in a state of being drawn out to an extent which corresponds to the width of the position detecting error. This arrangement, therefore, results in an increase of total length of the lens barrel obtained when the camera is not used for photo-taking.

BRIEF SUMMARY OF THE INVENTION

It is a first object of the invention to provide a lens barrel which is arranged to be capable of preventing a rack from disengaging from a feed screw when a movable lens in the lens barrel is pushed by an external force in an optical axis direction.

It is a second object of the invention to provide a lens barrel arranged to reduce its total length obtained in a maximum drawn-in (retracted) state.

To attain the above objects, in accordance with an aspect of the invention, there is provided a lens barrel, comprising a shaft member extending in an optical axis direction, the shaft member having a screw part formed thereon and the shaft member being arranged to be driven by a motor to rotate on an axis thereof, a moving member having a screw-engaging part engaging the screw part of the shaft member, the moving member being arranged to move in the optical axis direction, a holding member holding a lens, the holding member and the moving member being moved together in the optical axis direction by rotation of the shaft member, an urging member arranged to urge the holding member and the moving member to move in the optical axis direction, and a stopper arranged to have the holding member to abut thereon when the holding member moves relative to the moving member against an urging force of the urging member.

In the lens barrel according to the invention, the motor is controlled to drive and cause the holding member to move up to and stop at a position immediately before where the holding member abuts on the stopper.

The lens barrel according to the invention is included in a camera body.

In the lens barrel according to the invention, the urging member is arranged to impart the urging force in such directions as to cause the holding member and the moving member to move away from each other.

Alternatively, the urging member is arranged to impart the urging force in such directions as to cause the holding member and the moving member to move toward each other.

The above and further objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
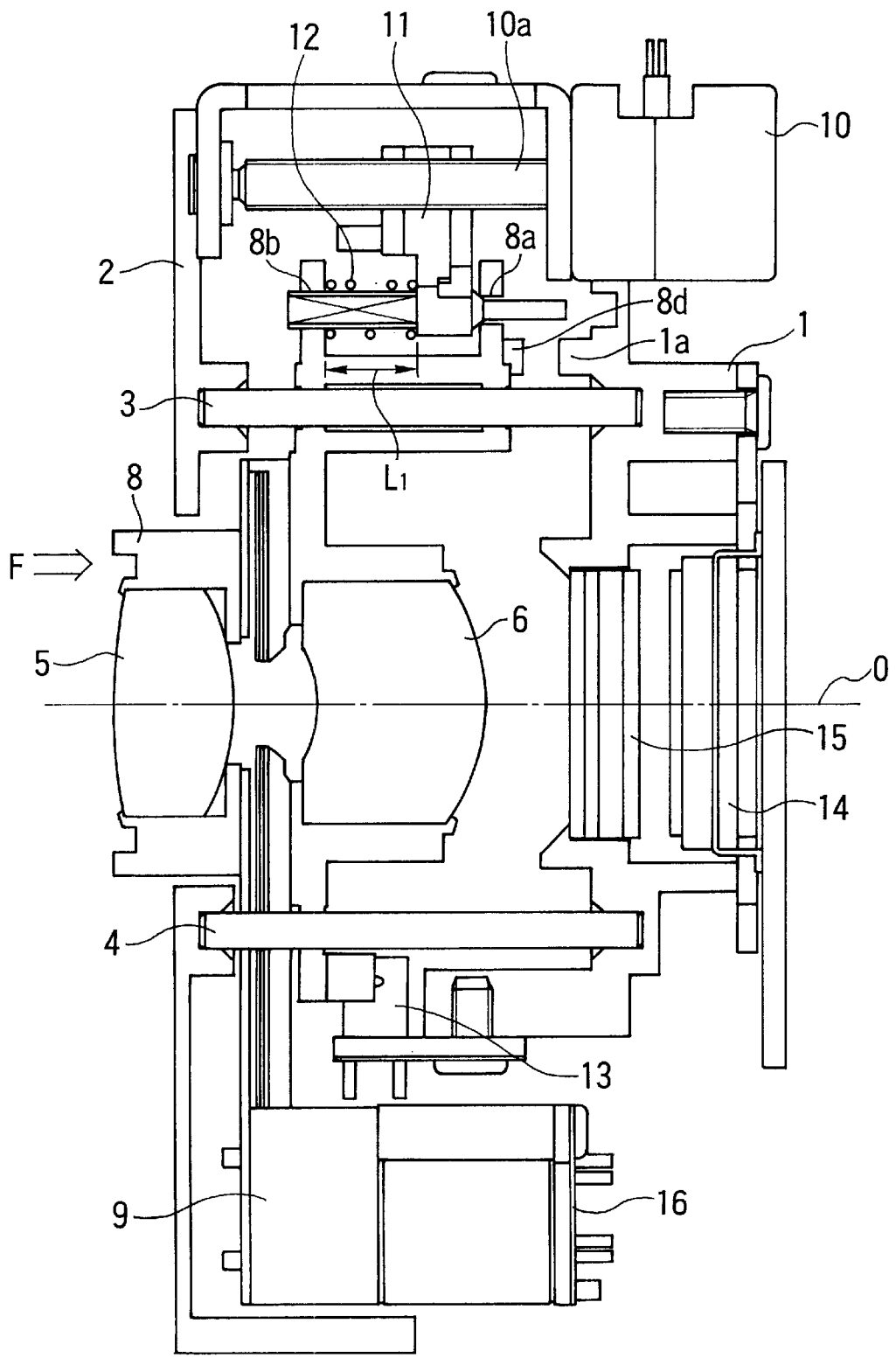
FIG. 1 is a sectional view showing a lens barrel according to a first embodiment of the invention.
Figure 2:
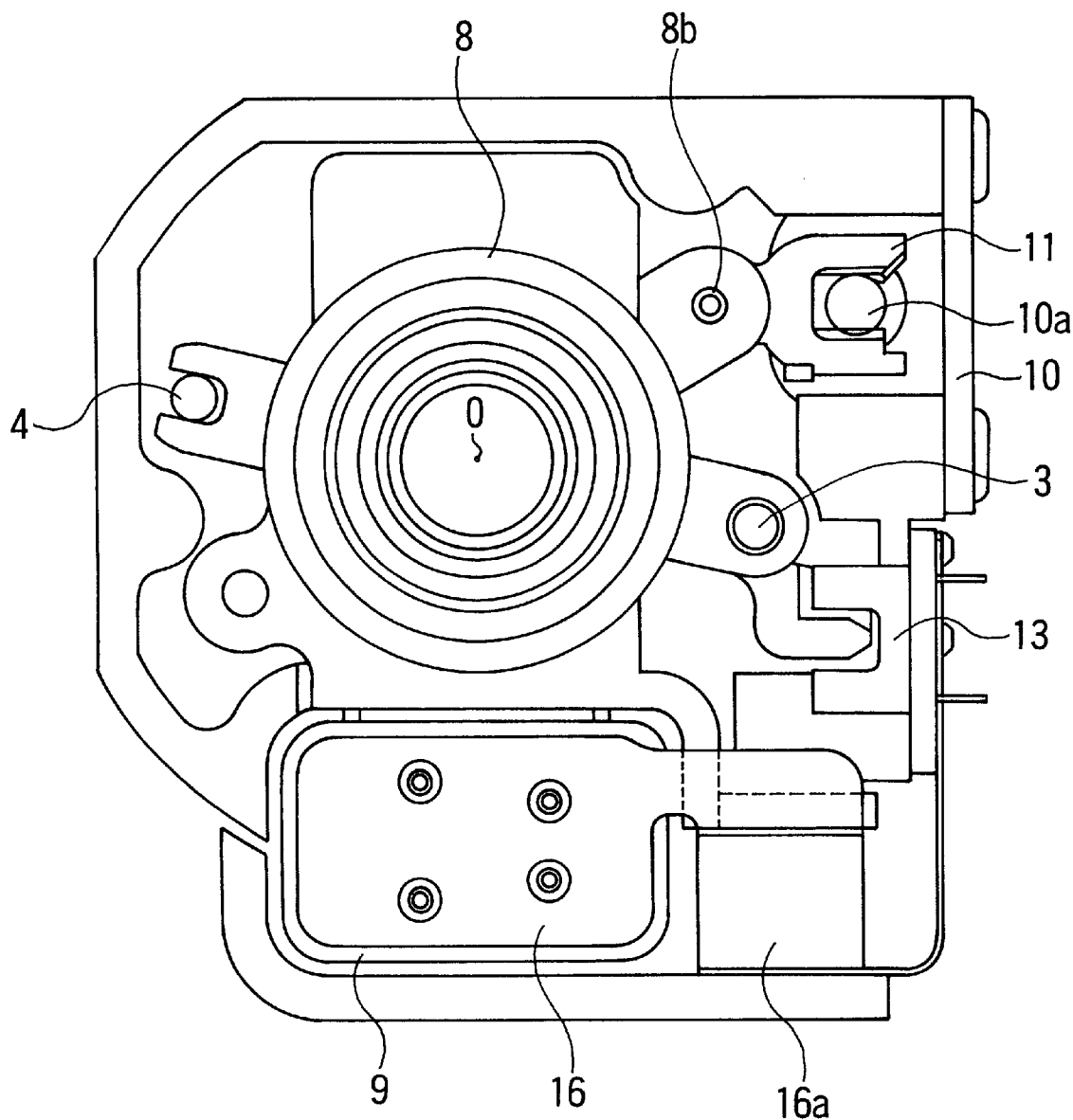
FIG. 2 is a front sectional view of the lens barrel shown in FIG. 1.
Figure 3:
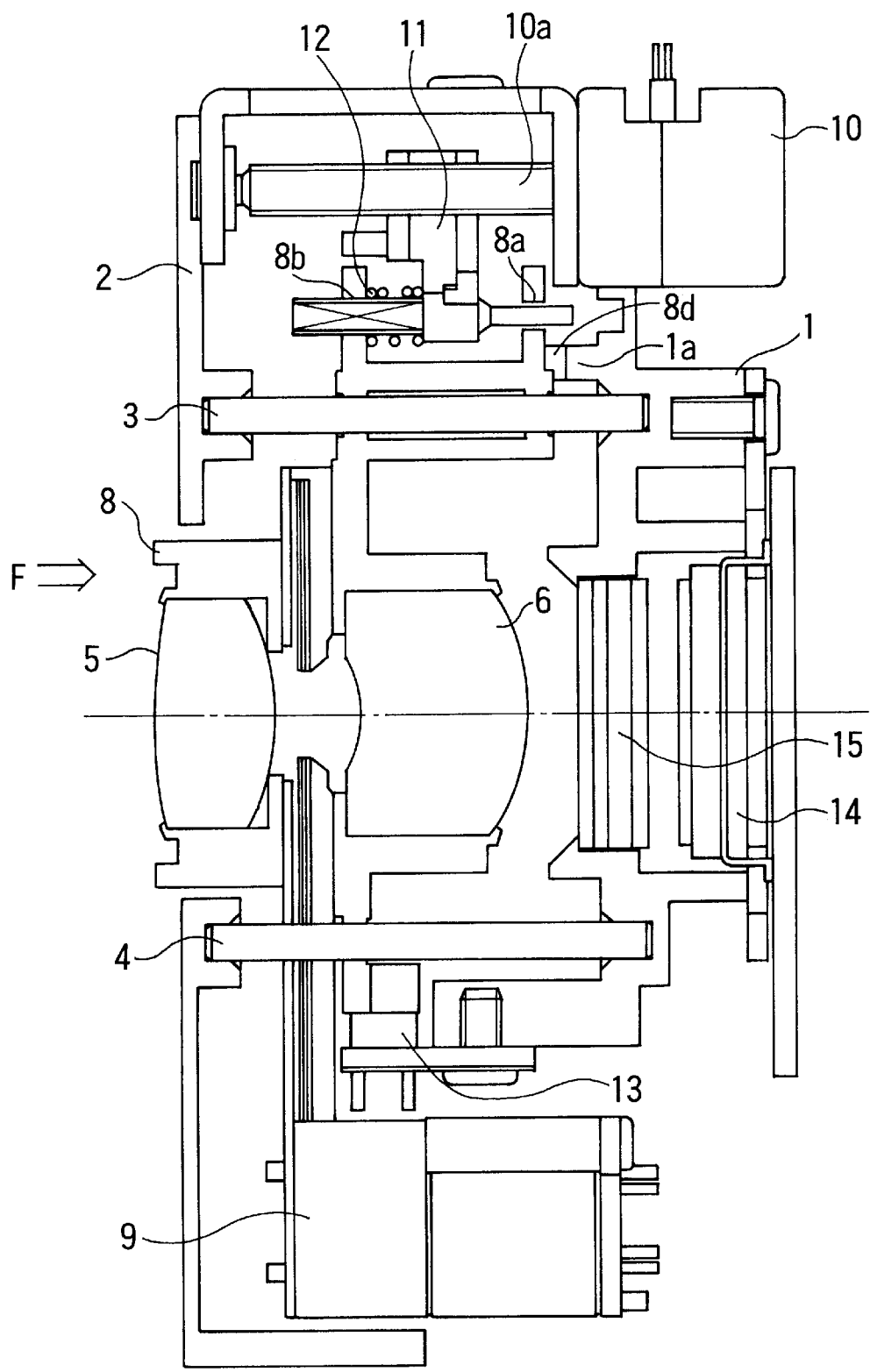
FIG. 3 is a sectional view showing the lens barrel shown in FIG. 1, in a state in which a movable lens frame is pushed inward in the optical axis direction.

FIG. 1 is a sectional view showing a lens barrel according to a first embodiment of the inventions, in which positions of lenses, etc., in the optical axis direction of the lens barrel are illustrated. FIG. 2 is a section of the lens barrel taken on a plane perpendicular to the optical axis O. FIG. 3 shows the lens barrel shown in FIG. 1, in a state in which a movable lens frame has been moved in the optical axis direction.

Referring to FIGS. 1, 2 and 3, a fixed lens frame 1 (a fixed member) is either mounted on the body of an optical apparatus body (a camera body) (not shown) or formed integrally with the optical apparatus body (camera body).

A front frame 2 is mounted on the lens frame 1. A sleeve bar 3 is supported by the lens frame 1 and the front frame 2 in a state of being interposed in between them and extends in the optical axis direction. A rotation restricting bar 4 is supported by the lens frame 1 and the front frame 2 also in a state of being interposed in between them.

A front movable lens 5 and a rear movable lens 6 are arranged to be movable together in the optical axis direction during focusing. A movable lens frame 8 (a lens holding member) holds the front movable lens 5 and the rear movable lens 6. The movable lens from 8 is arranged to be slidable relative to the sleeve bar 3 in the optical axis direction and to be restrained by the rotation restricting bar 4 from rotating relative to the sleeve bar 3. A diaphragm unit 9 is mounted on the movable lens frame 8.

A stepping motor 10 is mounted on the lens frame 1. The stepping motor 10 is provided with a shaft member 10a which extends in the optical axis direction. A feed screw is formed on the shaft member 10a of the stepping motor 10 to transmit the output of the motor 10. A rack 11 is in mesh with the feed screw of the shaft member 10a of the stepping motor 10 and has its two ends inserted in holes 8a and 8b formed in the movable lens frame 8. The rack 11 is thus arranged to be movable relative to the movable lens frame 8 in the optical axis direction.

A rack spring 12 is arranged to urge the rack 11 biasedly toward a wall part of the movable lens frame 8 at which the hole 8a is formed. A position detector 13 is composed of a photo-sensor or the like and is arranged to detect arrival of the movable lens frame 8 at the rear end of a movable range thereof.

An image sensor unit 14 is composed of a CCD or the like and is mounted on the lens frame 1. A low-pass or infrared-cut filter 15 is also mounted on the lens frame 1. A flexible printed circuit board 16 is provided for energizing the diaphragm unit 9 and has a U-shaped part 16a which is arranged to exert a resilient force toward the sleeve bar 3. The U-shaped part 16a is arranged such that a force exerted on the rotation restricting bar 4 does not readily vary even when the resilient force of the U-shaped part 16a varies.

With the first embodiment arranged in the above-stated manner, when the stepping motor 10 is driven by a control circuit (not shown), the feed screw of the shaft member 10a rotates. Then, the movable lens frame 8 is caused to move in the optical axis direction by the intermeshed state of the feed screw of the shaft member 10a and the rack 11. The moving direction of the movable lens frame 8 can be changed by changing the rotating direction of the stepping motor 10.

The aperture diameter of the diaphragm unit 9 can be changed by driving the diaphragm unit 9 with the control circuit (not shown).

Here, when an unexpected external force F is imparted to the movable lens frame 8 in the direction of pushing the movable lens frame 8 inward, as shown in FIG. 3, the movable lens frame 8 moves in the optical axis direction, i.e., in the direction of inward pushing. However, the movable lens frame 8 is then caused by the elastic deformation of the rack spring 12 to shift in the optical axis direction with respect to the rack 11, so that the rack 11 can be kept in mesh with the feed screw of the shaft member 10a of the stepping motor 10.

Besides, since a stopper 8d which is provided on the movable lens frame 8 for acting in the optical axis direction comes to abut on a stopper 1a provided on the lens frame 1, the movable lens frame 8 which has been moved in the inward pushing direction is not allowed to move further in the optical axis direction.

When the lens barrel is not under the external force F, the rack 11 is located at a distance $L_1$ from the movable lens frame 8 in the optical axis direction. The distance L1 is set to be larger than a maximum amount of movement by which the movable lens frame 8 is movable relative to the lens frame 1 (which is not a maximum amount of driving by the stepping motor 10 and is an amount of movement by which the movable lens frame 8 moves on the sleeve bar 3 up to such a position as to abut on the lens frame 1 upon reception of the external force F). Therefore, wherever the movable lens frame 8 is located in the optical axis direction, the movable lens frame 8 in a state of shifting from the rack 11 eventually comes to abut on the stopper 1a of the lens frame 1, Accordingly, the rack 11 is prevented from being moved in the optical axis direction together with the movable lens frame 8 by the shift of the movable lens frame 8. In other words, the rack 11 never disengages from the feed screw of the shaft member 10a.

When the external force F disappears, the movable lens frame 8 is brought back to its initial position by the urging force of the rack spring 12 to permit focus adjustment, etc., to be performed with the lenses 5 and 6.

The first embodiment is arranged to vary the movable range of the movable lens frame 8 by means of a control circuit (not shown). A maximum drawn-in position, i.e., a maximum retracted position, for drawing the movable lens frame 8 inward beyond a range of photo-taking positions when the camera is not used for photo-taking is set at a point where a gap between the stopper 8d of the movable lens frame 8 in the optical axis direction and the movable-lens-frame stopper 1a of the lens frame 1 comes to have a minimum value. For example, at the time of assembly, the movable lens frame 8 is caused to be drawn inward by the motor 10 while the movement of the movable lens frame 8 in the optical axis direction is measured with a laser length-measuring instrument, a photonic sensor or the like. When the movable lens frame 8 ceases to move in the optical axis direction, i.e., when the measured value comes to vary no longer, the movable lens frame 8 is considered to have abutted on the lens frame 1. Then, a position obtained immediately before the abutting point is set as the maximum drawn-in (retracted) position of the movable lens frame 8. Then, the control circuit (not shown) is caused to store the amount of movement of the movable lens frame 8 from a position where the movable lens frame 8 is detected by the position detector 13 (a predetermined position) to the position immediately before the abutting point. Control over a maximum drawing-in action is performed according to the amount of movement thus stored. In other words, when the camera is not used for photo-taking, i.e., in stowing the lens barrel, the motor 10 is controlled to drive the movable lens frame 8 to move up to the position immediately before the stopper 1a and to bring the movable lens frame 8 to a stop there.

Alternatively, the stepping motor 10 may be arranged to be driven in the reverse direction from its position where the movable lens frame 8 ceases to be drawn inward in the optical axis direction. Then, another position of the stepping motor 10 where the movable lens frame 8 begins to move in the optical axis direction (where the measured value begins to vary) is considered to be a parting position where the movable lens frame 8 parts from the lens frame 1. The stepping motor 10 is driven from the parting position to a position where the movable lens frame 8 comes to be detected by the position detector 13. The amount of movement from the position where the movable lens frame 8 begins to move in the optical axis direction to the position where the movable lens frame 8 is detected by the position detector 13 (a predetermined position) is stored in the control circuit (not shown). The maximum amount of drawing the movable lens frame 8 inward is controlled on the basis of a value thus stored. The arrangement of the first embodiment described above permits reduction in total length of the lens barrel to be obtained when the lens is not in use for photo-taking.

Figure 4:
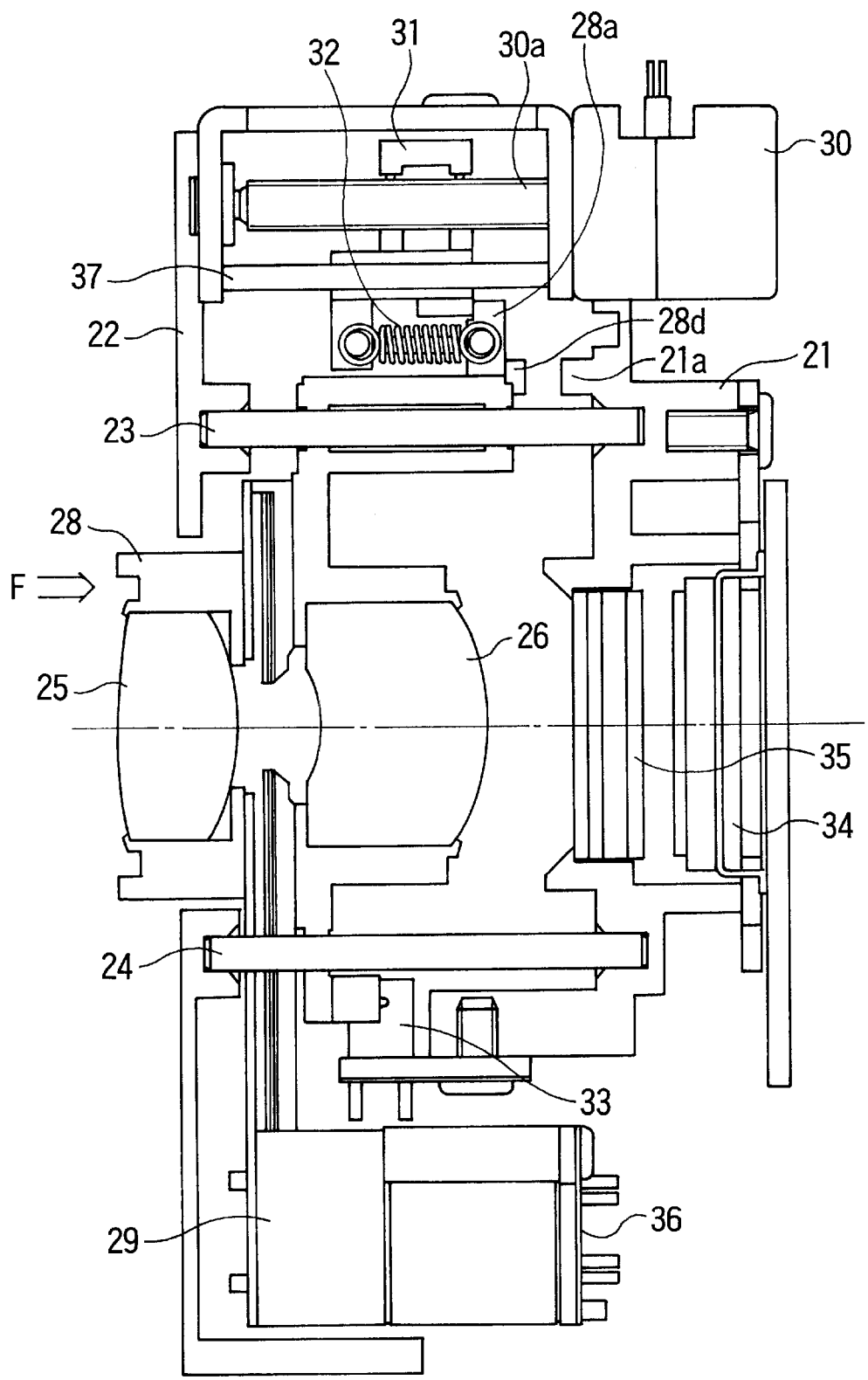
FIG. 4 is a sectional view showing a lens barrel according to a second embodiment of the invention.

FIG. 4 is a sectional view showing a lens barrel according to a second embodiment of the invention, in which the positions of lenses, etc., in the optical axis direction are illustrated.

In the second embodiment shown in FIG. 4, a fixed lens frame 21 (a fixed member) is either mounted on an optical apparatus body such as a camera body (not shown) or formed integrally with the optical apparatus body (camera body).

A front frame 22 is mounted on the lens frame 21. A sleeve bar 23 is supported between the lens frame 21 and the front frame 22 and extends in the optical axis direction. A rotation restricting bar 24 is supported between the lens frame 21 and the front frame 22.

A front movable lens 25 and a rear movable lens 26 are arranged to move together in the optical axis direction during focusing. A movable lens frame 28 holds the movable lenses 25 and 26 and is arranged to be slidable relative to the sleeve bar 23 in the optical axis direction. The rotation restricting bar 24 holds the movable lens frame 28 in such a way as to prevent the movable lens frame 28 from rotating relative to the sleeve bar 23.

A diaphragm unit 29 is mounted on the movable lens frame 28. A stepping motor 30 is mounted on the lens frame 21. A rack 31 is in mesh with a feed screw 30a of a shaft member of the stepping motor 30 and is fitted on a bar 37 attached to the stepping motor 30. The rack 31 is thus arranged to be movable in the optical axis direction. A rack spring 32 is arranged to urge the rack 31 biasedly toward a flange 28a of the movable lens frame 28.

A position detector 33 is composed of a photo-sensor or the like and is arranged to detect arrival of the movable lens frame 28 at the rear end of a movable range thereof. An image sensor unit 34 is composed of a CCD or the like and is mounted on the lens frame 21. A low-pass or infrared-cut filter 35 is also mounted on the lens frame 21. A flexible printed circuit board 36 is provided for energizing the diaphragm unit 29.

In the arrangement described above, the stepping motor 30 is arranged to be driven by a control circuit (not shown). When, the stepping motor 30 is driven to rotate the feed screw 30a, the intermeshing state of the feed screw 30a and the rack 31 causes the movable lens frame 28 to move in the optical axis direction. The moving direction of the movable lens frame 28 can be changed by changing the rotating direction of the stepping motor 30.

The diaphragm aperture is adjustable by driving the diaphragm unit 29 with the control circuit (not shown).

If an unexpected external force F is imparted to the movable lens frame 28 in the direction of pushing the movable lens frame 28 inward, the movable lens frame 28 moves in the optical axis direction. However, the movable lens frame 28 is then caused by the elastic deformation of the rack spring 32 to shift in the optical axis direction with respect to the rack 31. By virtue of the shift of the movable lens frame 28, the rack 31 can be kept in mesh with the feed screw 30a.

Besides, since a stopper 28d which is provided on the movable lens frame 28 comes to abut on a stopper 21a provided on the lens frame 21, the movable lens frame 28 which has been moved in the inward pushing direction never moves further in the optical axis direction.

When the lens barrel is not under the external force F, the rack 31 is located at a distance from the movable lens frame 28 in the optical axis direction. That distance is set to be larger than a maximum amount of movement by which the movable lens frame 28 is movable relative to the lens frame 21 (which is not a maximum amount of driving by the stepping motor 30 and is an amount of movement by which the movable lens frame 28 moves on the sleeve bar 23 up to such a position as to abut on the lens frame 21 upon reception of the external force F). Therefore, wherever the movable lens frame 28 is located in the optical axis direction, the movable lens frame 28 in a state of shifting from the rack 31 eventually comes to abut on the stopper 21a of the lens frame 21, Accordingly, the rack 31 is prevented from being moved in the optical axis direction together with the movable lens frame 28 by the shift of the movable lens frame 28. In other words, the rack 31 never disengages from the feed screw 30a.

When the external force F disappears, the movable lens frame 28 is brought back to its initial position by the urging force of the rack spring 32 to permit focus adjustment, etc., to be performed with the lenses 25 and 26.

Control over the maximum drawing-in action on the movable lens frame 28 in the second embodiment is performed in the same manner as in the first embodiment.

The shape of the rack and the urging means for urging the rack biasedly toward the movable lens frame are not limited to those of the first and second embodiments described in the foregoing. For example, the urging means may be formed integrally with the movable lens frame.

In the case of each embodiment disclosed, the invention is applied to a focusing lens. However, the disclosed arrangement according to the invention applies also to a zooming lens.

As described in the foregoing, when a lens holding member or a lens held by the lens holding member is pushed inward by an external force, the position of the lens holding member shifts in the optical axis direction (in the direction of pushing) with respect to the rack which is in mesh with the feed screw of the stepping motor. Further, in such a case, even when the shift takes place to a great extent, the lens holding member comes to abut on a fixed member to restrict the further shift with respect to the rack. The rack, therefore, can be reliably prevented from disengaging from the feed screw.

Further, according to the invention, the lens holding member and the fixed member can be arranged to have a minimal gap between them in the optical axis direction when the lens barrel is not in use for photo-taking. Therefore, the lens barrel can be arranged to have a shorter total length when it is in a state of being drawn inward to a maximum extent.

What is claimed is:

1. A lens device comprising:
    a shaft member extending in an optical axis direction, said shaft member having a screw part formed thereon and said shaft member being arranged to be driven by a motor to rotate on an axis thereof;
    a moving member having a screw-engaging part engaging the screw part of said shaft member, said moving member being arranged to move in the optical axis direction;
    a holding member holding a lens, said holding member and said moving member being moved together in the optical axis direction by rotation of said shaft member and also being movable relative to one another in the optical axis direction;

an urging member arranged to urge said holding member and said moving member to move together in the optical axis direction and to permit the relative movement therebetween upon application of an external force to said holding member; and a stopper arranged to have said holding member to abut thereon when said holding member moves relative to said moving member against an urging force of said urging member.

2. A lens barrel according to claim 1, wherein said motor is controlled to drive and cause said holding member to move up to and stop at a position immediately before where said holding member abuts on said stopper.

3. A lens barrel according to claim 1, wherein said lens barrel is included in a camera body.

4. A lens barrel according to claim 1, wherein said urging member is arranged to impart the urging force in such directions as to cause said holding member and said moving member to move away from each other.

5. A lens barrel according to claim 1, wherein said urging member is arranged to impart the urging force in such directions as to cause said holding member and said moving member to move toward each other.

6. An optical apparatus having a lens comprising:

an image pickup device picking up an image formed by a lens;

a shaft member extending in an optical axis direction, said shaft member having a screw part formed thereon and said shaft member being arranged to be driven by a motor to rotate on an axis thereof;

a moving member having a screw-engaging part engaging the screw part of said shaft member, said moving member being arranged to move in the optical axis direction;

a holding member holding said lens, said holding member and said moving member being moved together in the optical axis direction by rotation of said shaft member and also being movable relative to one another in the optical axis direction;

an urging member arranged to urge said holding member and said moving member to move together in the optical axis direction and to permit relative movement therebetween upon the application of an external force to said holding member; and a stopper arranged to have said holding member to abut thereon when said holding member moves relative to said moving member against an urging force of said urging member.

* * * * *

UNITED STATES PATENT AND TRADEMARK OFFICE
CERTIFICATE OF CORRECTION

PATENT NO.    : 6,473,567 B1                              Page 1 of 1
DATED         : October 29, 2002
INVENTOR(S)   : Shigeo Nakashima It is certified that error appears in the above-identified patent and that said Letters Patent is hereby corrected as shown below:

<u>Title page,</u>
Item [57], ABSTRACT,
Line 4, delete "thereof A" and insert -- thereof. A --.

Signed and Sealed this

Ninth Day of September, 2003

JAMES E. ROGAN
*Director of the United States Patent and Trademark Office*